US012391117B2

(12) United States Patent
Somarowthu et al.

(10) Patent No.: US 12,391,117 B2
(45) Date of Patent: Aug. 19, 2025

(54) SYSTEM AND METHOD TO OPERATE CRUISE CONTROL FOR SELF-PROPELLED WINDROWER

(71) Applicant: DEERE & COMPANY, Moline, IL (US)

(72) Inventors: Mahesh Somarowthu, Pune (IN); Mohan A. Vadnere, Pune (IN); Mitchell R. Usasz, Ottumwa, IA (US)

(73) Assignee: Deere & Company, Moline, IL (US)

( * ) Notice: Subject to any disclaimer, the term of this patent is extended or adjusted under 35 U.S.C. 154(b) by 196 days.

(21) Appl. No.: 18/093,402

(22) Filed: Jan. 5, 2023

(65) Prior Publication Data

US 2024/0227554 A1 Jul. 11, 2024

(51) Int. Cl.
B60K 31/00 (2006.01)
A01B 76/00 (2006.01)

(52) U.S. Cl.
CPC .............. B60K 31/00 (2013.01); A01B 76/00 (2013.01)

(58) Field of Classification Search
CPC ................................. B60K 31/00; A01B 76/00
See application file for complete search history.

(56) References Cited

U.S. PATENT DOCUMENTS

| 9,238,407 | B1* | 1/2016 | Brito | B60W 30/14 |
| 2003/0004630 | A1* | 1/2003 | Beck | A01D 41/127 |
| | | | | 701/50 |
| 2009/0138168 | A1* | 5/2009 | Labuhn | B60W 30/17 |
| | | | | 701/93 |
| 2018/0125010 | A1* | 5/2018 | Gresch | A01F 17/02 |
| 2019/0047562 | A1* | 2/2019 | Michaluk | B60L 15/20 |
| 2019/0183048 | A1* | 6/2019 | Flintoft | A01D 34/246 |
| 2020/0001869 | A1* | 1/2020 | Lotz | B60W 30/143 |
| 2023/0389468 | A1* | 12/2023 | Ito | A01D 34/008 |

* cited by examiner

Primary Examiner — Todd Melton
Assistant Examiner — Matthew Ho
(74) Attorney, Agent, or Firm — Taft Stettinius & Hollister LLP; Stephen F. Rost

(57) ABSTRACT

A cruise control system and method for a work vehicle with vehicle interlocks, and a controller. Each vehicle interlock monitors a vehicle system status. When at least one of the vehicle interlocks is triggered, the controller notifies the operator of the triggered interlock and deactivates cruise control. An activation mechanism can activate cruise control. When the activation mechanism is activated and none of the vehicle interlocks is triggered, the controller activates cruise control and maintains current vehicle ground speed at a vehicle cruise speed. When the activation mechanism is deactivated, the controller deactivates cruise control. The cruise speed can be set to the current vehicle ground speed, or can be set by a speed selection mechanism, or can resume at a previously selected cruise speed, or can be set by another method.

20 Claims, 3 Drawing Sheets

SYSTEM AND METHOD TO OPERATE CRUISE CONTROL FOR SELF-PROPELLED WINDROWER

FIELD OF THE DISCLOSURE

The present disclosure relates to agricultural machines, and more specifically relates to cruise control systems for agricultural windrower machines.

BACKGROUND

Windrower operators are typically interested in faster machine speeds and rows that are uniform in density and width. One of the ways to help generate rows of uniform density and width is to maintain the vehicle speed while generating the rows. The vehicle speed can vary in the filed for various reasons, including for example varying engine loads, changing crop density, varying ground contours, etc. The vehicle operator typically needs to manually control the vehicle speed using a control stick, accelerator pedal or other speed control. It can be challenging to maintain a constant vehicle speed for long periods of time, especially when various factors affecting vehicle speed can change over time.

It would be desirable to have a cruise control system and method to help the operator maintain a relatively constant vehicle speed while generating the rows in order to help generate rows of uniform density and width.

SUMMARY

A cruise control system for a work vehicle is disclosed that includes one or more vehicle interlocks, and a cruise control controller. Each of the one or more vehicle interlocks monitors a vehicle system status. The cruise control controller monitors the one or more vehicle interlocks. When at least one of the vehicle interlocks is triggered and cruise control is not activated, the cruise control controller prevents cruise control activation. When at least one of the vehicle interlocks is triggered and cruise control is activated, the cruise control controller notifies the operator of the triggered vehicle interlock and deactivates cruise control. When none of the vehicle interlocks is triggered, the cruise control controller activates cruise control and maintains current vehicle ground speed at a vehicle cruise speed.

The cruise control system can also include a cruise control activation mechanism that enables an operator to activate cruise control. The cruise control controller can also monitor the cruise control activation mechanism. When none of the vehicle interlocks is triggered and the cruise control activation mechanism is activated, the cruise control controller can activate cruise control and maintain the current vehicle ground speed at the vehicle cruise speed. When the cruise control activation mechanism is deactivated, the cruise control controller can deactivate cruise control and prevent cruise control activation regardless of whether any of the vehicle interlocks is triggered.

The cruise control system can also include a vehicle ground speed interface that monitors the current vehicle ground speed, and a cruise speed selection mechanism that sets the vehicle cruise speed to the vehicle ground speed when cruise control is activated. The cruise control system can also include a cruise speed selection mechanism that enables the operator to select the vehicle cruise speed. The cruise control system can also include a cruise resume selection mechanism that enables the operator to set the vehicle cruise speed to a previously selected cruise speed.

The one or more vehicle interlocks can include a parking brake interlock, and when the parking brake interlock indicates the parking brake is activated then the cruise control controller can deactivate and prevent activation of cruise control. The cruise control system can also include a vehicle ground speed interface that monitors vehicle ground speed, and the one or more vehicle interlocks can include a minimum cruise speed interlock that sets a minimum cruise control speed, and when the vehicle ground speed is or goes below the minimum cruise control speed then the cruise control controller can deactivate and prevent activation of cruise control. The one or more vehicle interlocks can include an implement status interlock, and when the implement status interlock indicates a monitored implement is raised then the cruise control controller can deactivate cruise control. When a vehicle interlock is triggered while the cruise control activation mechanism is activated or cruise control is active, the cruise control controller can notify the operator of the triggered interlock and deactivate cruise control.

The cruise control system can also include an implement interface that monitors header load information, and the cruise control controller can predict possible vehicle ground speed changes based on the header load information, and take preventative action based on the predicted possible vehicle ground speed changes to maintain vehicle ground speed at the vehicle cruise speed. The preventative action can include adjusting vehicle engine speed based on the predicted possible vehicle ground speed changes.

A cruise control method for a work vehicle is disclosed that includes monitoring one or more vehicle interlocks where each of the vehicle interlock monitors a vehicle system status. When at least one of the vehicle interlocks is triggered and cruise control is not activated, notifying the operator of the triggered vehicle interlock and preventing cruise control activation. When at least one of the vehicle interlocks is triggered and cruise control is activated, notifying the operator of the triggered vehicle interlock and deactivating cruise control. When none of the vehicle interlocks is triggered, activating cruise control and maintaining vehicle ground speed at a vehicle cruise speed.

The cruise control method can also include monitoring a cruise control activation mechanism that enables an operator to activate cruise control. When the cruise control activation mechanism is activated and none of the vehicle interlocks is triggered, the method can also include activating cruise control and maintaining the vehicle ground speed at the vehicle cruise speed. When the cruise control activation mechanism is deactivated, the method can also include deactivating cruise control and preventing cruise control activation regardless of whether any of the one or more vehicle interlocks is triggered.

The cruise control method can also include monitoring the vehicle ground speed; and when activating cruise control, setting the vehicle cruise speed to the current vehicle ground speed. The cruise control method can also include monitoring a cruise speed selection mechanism that enables the operator to select the vehicle cruise speed, and when cruise control is activated, maintaining the vehicle ground speed at the selected vehicle cruise speed. The cruise control method can also include monitoring a cruise resume selection mechanism, and when the cruise resume selection mechanism is activated and none of the vehicle interlocks is triggered, activating cruise control and maintaining the vehicle cruise speed at a previously selected cruise speed. The cruise control method can also include, when a vehicle interlock is triggered while the cruise control activation mechanism is activated or cruise control is active, notifying the operator of the triggered interlock and deactivating cruise control.

The cruise control method can also include, when cruise control is activated, monitoring header load information, calculating vehicle acceleration and/or predicting possible vehicle ground speed changes based on the header load information, and taking preventative action based on the predicted possible vehicle acceleration and/or ground speed changes to maintain vehicle ground speed at the vehicle cruise speed. The preventative action can include adjusting engine speed to maintain vehicle ground speed at the vehicle cruise speed.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
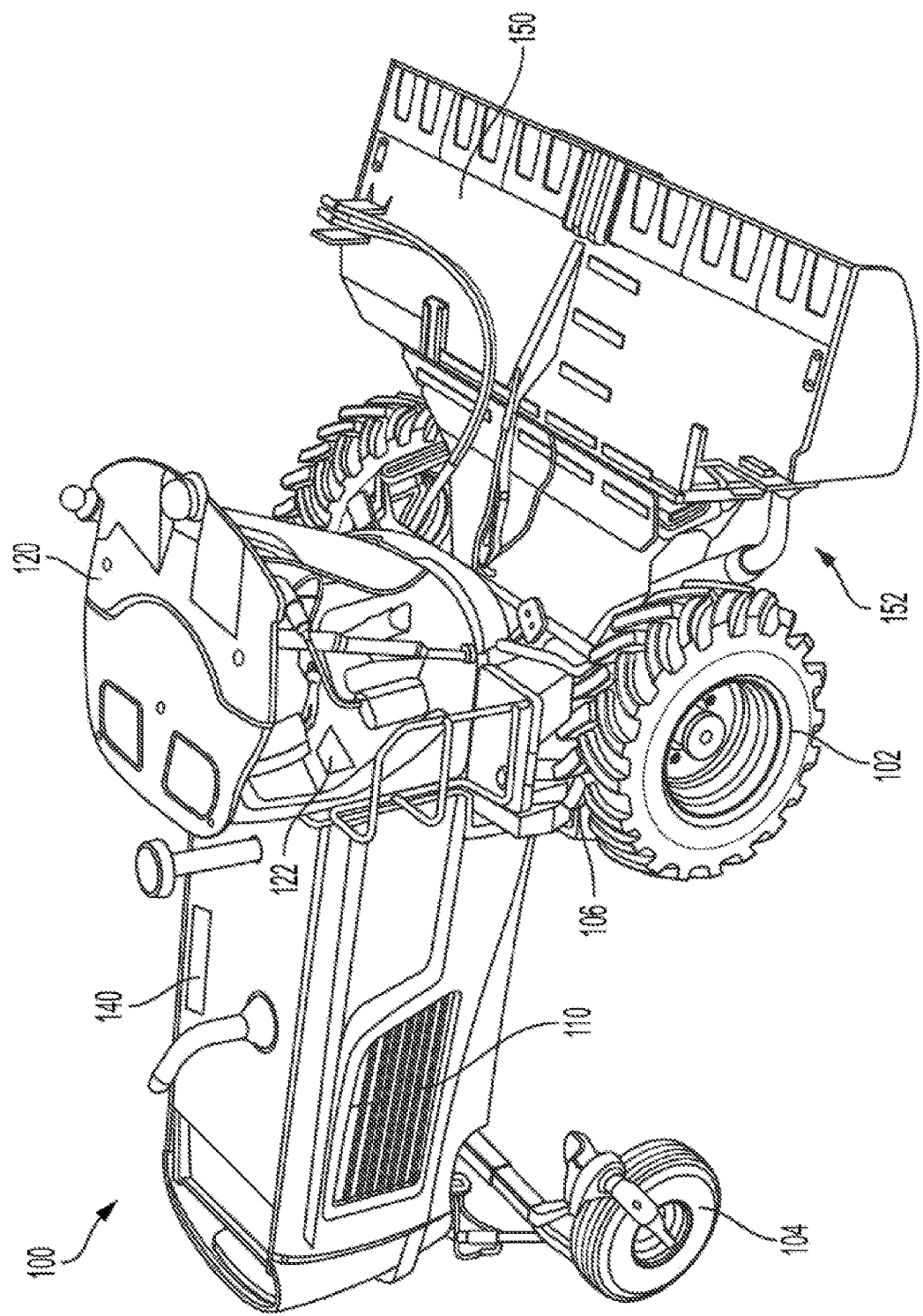
FIG. 1 illustrates an perspective view of a work machine coupled to a head or implement.

FIG. 1 illustrates an perspective view of a work machine or vehicle 100, windrower shown, coupled to a head or implement 150. The work machine 100 may have a power unit 110 that provides mechanical, electrical and hydraulic power to the work machine 100, and can provide power to rotate a pair of drive wheels 102 coupled to a frame 106 of the work machine 100. The drive wheels 102 may rotate relative to the work machine 100 to allow the work machine 100 to traverse an underlying or ground surface. In addition to drive wheels 102, the embodiment shown in FIG. 1 has a pair of swivel caster wheels 104. The caster wheels 104 may pivot freely about a mount to allow the work machine 100 to rotate as directed by the powered drive wheels 102 and caster wheels 104. However, the particular configuration of the drive wheels 102 and caster wheels 104 should not be limiting. In a different embodiment, there may be no wheels at all. Rather, the power unit 110 may provide power to a pair of tracks to allow the work machine 100 to traverse the underlying surface. In yet another embodiment, the caster wheels 104 may not be swivel caster wheels but rather be wheels coupled to an axle and configured to be mechanically coupled to the power unit 110.

The work machine 100 may also have a cabin 120 coupled to the frame 106, and an implement mounting and positioning system 152 that can include lift arms, brackets, actuators and other mechanisms to connect and control the implement 150. The cabin 120 may house a plurality of controls 122 that allow a user to control the various systems of the work machine 100 and the implement 150. In one non-exclusive embodiment, the plurality of controls 122 are coupled to a control system 140 that monitors and send control signals to various mechanical, electrical, and hydraulic systems of the work machine 100 and the implement 150. The plurality of controls 122 may be positioned in the cabin 120 and may include one or more touch screens, knobs, buttons, levers, or any other devices capable of identifying a user input.

The cruise control system and method will enable an operator of the machine 100 to engage or control cruise control and set a vehicle cruise speed set point for the cruise control, and then to maintain the vehicle speed at the cruise speed set point while the cruise control is activated, and enable the operator to disengage cruise control.

Figure 2:
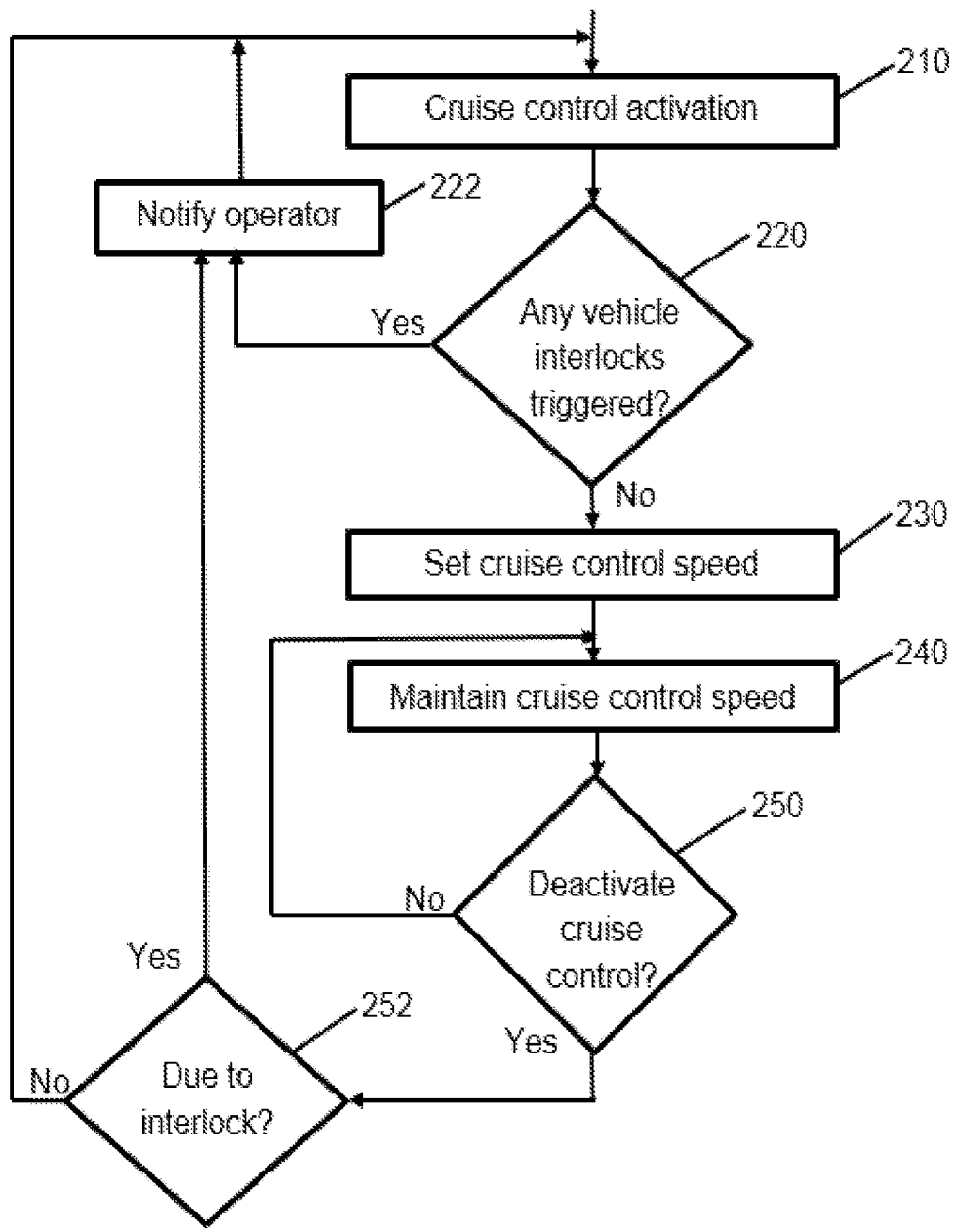
FIG. 2 illustrates an exemplary flow diagram for a cruise control system.
Figure 3:
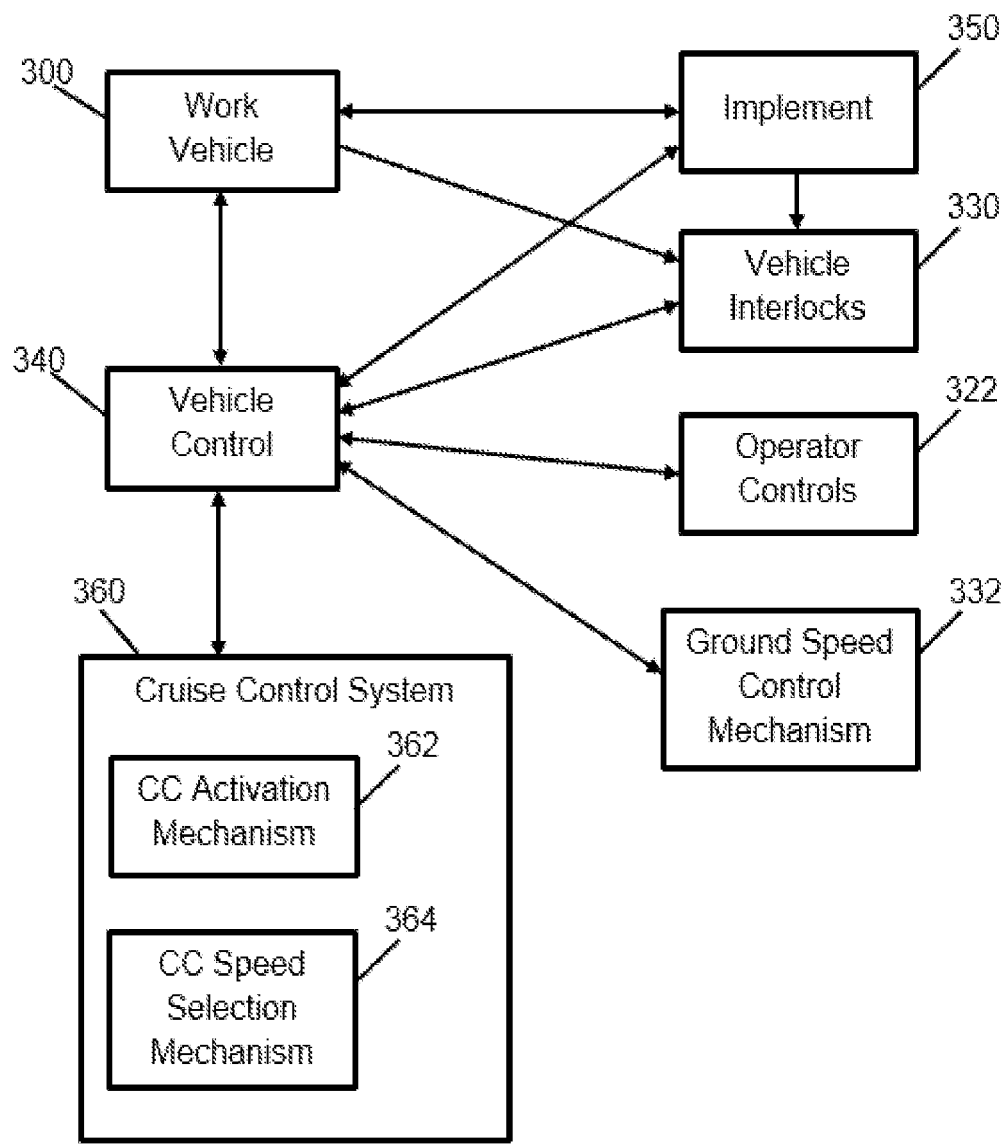
FIG. 3 illustrates a block diagram showing exemplary components of a work vehicle coupled to an implement.

FIG. 2 illustrates an exemplary flow diagram for a cruise control system 360. FIG. 3 illustrates a block diagram showing exemplary components of a work vehicle 300 coupled to an implement 350.

The work vehicle 300 can include a vehicle control system 340, operator controls 322, vehicle interlocks 330 and the cruise control system 360. The vehicle control system 340 can control the various systems and components of the work vehicle 300 and the implement 350. The vehicle control system 340 can be coupled to the operator controls 322 in the cabin 120 that the operator can use to control the work vehicle 300 and the implement 350 and receive status notifications regarding the work vehicle 300 and the implement 350.

The vehicle control system 340 can also be coupled to one or more vehicle interlocks 330 that indicate the status of various systems and components of the work vehicle 300 and the implement 350. One or more, but not necessarily all, of the vehicle interlocks 330 can prevent activation of and/or deactivate cruise control.

The vehicle control system 340 can also be coupled to or can include a vehicle ground speed control system 332. The ground speed control system 332 can monitor and control the ground speed of the vehicle 300. The ground speed control system 332 can generate ground speed signals that indicate the current vehicle ground speed. The ground speed control system 332 can also receive and/or generate ground speed control signals to increase or decrease the current vehicle ground speed.

The cruise control system 360 can be coupled to the vehicle control system 340 to receive and transmit various control and status signals regarding the work vehicle 300 and the implement 350. Alternatively, the cruise control system 360 can be coupled to one or more systems and components of the work vehicle 300 and the implement 350 without going through the vehicle control system 340. The cruise control system 360 can include or be coupled to one or more of a cruise control activation mechanism 362, a cruise control speed selection mechanism 364, and various other mechanisms.

The following discussion of the exemplary cruise control flow diagram of FIG. 2 refers to the exemplary block diagram of FIG. 3. At block 210, the cruise control system 360 checks a cruise control activation mechanism 362 to determine whether the operator wants to activate cruise control. Cruise control can be activated in various ways. Cruise control can be activated by selecting the cruise control activation mechanism 362 in the operator controls 322. Cruise control can alternatively be activated by default when there are no failed interlocks. Cruise control activation, whether by default or operator action, can include selecting a vehicle cruise speed set point. The vehicle cruise speed set point can be set using a cruise control speed selection mechanism 364, selecting a current vehicle speed as the cruise speed set point, or selecting a resume option to return to a default or previously selected vehicle cruise speed set point. As another alternative, the current vehicle speed can be locked as the vehicle cruise speed set point when the operator activates an auto-track feature of the vehicle.

At block 220, the cruise control system 360 can check if any of the vehicle interlocks 330 are triggered that can prevent cruise control activation. Various of the vehicle interlocks 330 can prevent cruise control activation, for example, the parking brake being activated, the vehicle speed being below some cruise control threshold speed, the operator not being seated in the cab 120, etc. If any of the vehicle interlocks 330 are triggered that can prevent cruise control activation then control passes to block 222, otherwise control passes to block 230.

At block 222, at least one of the vehicle interlocks 330 is triggered that prevents cruise control activation, and a warning notification is given to the operator that there is at least one of the vehicle interlocks 330 preventing cruise control activation. This warning notification can identify any or all of one or more vehicle interlock(s) 330 currently preventing cruise control activation. After the warning notification is given control passes back to block 210.

At block 230, the operator has selected cruise control activation and there are no vehicle interlocks 330 preventing cruise control activation, so cruise control is activated and the vehicle cruise speed is set using some type of cruise control speed selection mechanism 364. The cruise control speed selection mechanism 364 can, for example, select a current vehicle ground speed as the cruise speed, or select a cruise speed independent of the current vehicle ground speed, have a resume option that selects a default or previously selected vehicle cruise speed. A cruise control activation indication can be given to the operator using the plurality of controls 322 when cruise control is activated. Control then passes to block 240.

At block 240, the cruise control system 360 adjusts the vehicle speed to the selected cruise speed and maintains the vehicle speed at the cruise speed. The cruise control system 360 can monitor the current vehicle ground speed by monitoring the ground speed signals from the ground speed control system 332. The cruise control system 360 can then generate ground speed control signals to be sent to the ground speed control system 332 to increase or decrease the vehicle ground speed to maintain the selected cruise speed. The cruise control system 360 can monitor the current vehicle ground speed using vehicle speed sensors, wheel speed sensors, or some other method. The cruise control system 360 can adjust the vehicle ground speed by controlling flow to a wheel motor, by adjusting engine speed/torque using speed governance features, or by other methods. Alternatively, the cruise control system 360 can use throughput and header load information to predict possible vehicle acceleration/deceleration and/or changes in vehicle ground speed, and take preventative action by adjusting engine speed to maintain vehicle ground speed at the selected cruise speed. Control then passes to block 250.

At block 250, the cruise control system 360 can check whether cruise control should be deactivated. Cruise control can be disengaged or deactivated in various ways. Cruise control can be deactivated by unselecting the cruise control activation mechanism 362. Cruise control can be deactivated by the operator moving a control stick, an accelerator pedal, or other control of the operator controls 322 to change vehicle ground speed. Cruise control can be deactivated by deactivation of the auto-track feature of the work vehicle 300. Cruise control can be deactivated if the implement 350 is raised or disengaged. Cruise control can be deactivated by the triggering of one of the vehicle interlocks 330, for example, the operator leaving the seat in the cab 120, the vehicle ground speed going below some cruise speed threshold, the parking brake being activated, etc. If cruise control is not deactivated, then control passes back to block 240 to maintain the cruise speed. If cruise control is deactivated, then speed control of the vehicle 300 is returned to the operator and control passes to block 252. If cruise control is deactivated, any cruise control activation indication can also be deactivated.

At block 252, the cruise control system 360 checks whether cruise control deactivation is due to one of the vehicle interlocks 330. If cruise control deactivation is due to a vehicle interlock 330, then control passes to block 222 for the system to give a warning notification to the operator that cruise control was deactivated due to the vehicle interlock 330. If cruise control deactivation is not due to a vehicle interlock 330, then control passes back to block 210.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A cruise control system for a work vehicle, the cruise control system comprising:
    one or more vehicle interlocks, each of the one or more vehicle interlocks configured to monitor a vehicle system status;
    an implement interface configured to monitor header load information; and
    a cruise control controller configured to monitor the one or more vehicle interlocks;
    wherein when at least one of the one or more vehicle interlocks is triggered and cruise control is not activated, the cruise control controller prevents cruise control activation;
    wherein when at least one of the one or more vehicle interlocks is triggered and cruise control is activated, the cruise control controller notifies an operator of the at least one triggered vehicle interlock and deactivates cruise control; and
    wherein when none of the one or more vehicle interlocks is triggered, the cruise control controller activates cruise control, predicts changes to a vehicle ground speed based on the header load information, and takes preventative action based on the predicted changes to the vehicle ground speed to maintain the vehicle ground speed at a vehicle cruise speed.

2. The cruise control system of claim 1, further comprising:
    a cruise control activation mechanism configured to enable the operator to activate cruise control;

wherein the cruise control controller is further configured to monitor the cruise control activation mechanism;

wherein when none of the one or more vehicle interlocks is triggered and the cruise control activation mechanism is activated, the cruise control controller activates cruise control and maintains the vehicle ground speed at the vehicle cruise speed; and wherein when the cruise control activation mechanism is deactivated, the cruise control controller deactivates cruise control and prevents cruise control activation regardless of whether any of the one or more vehicle interlocks is triggered.

3. The cruise control system of claim 1, further comprising:
a vehicle ground speed interface configured to monitor the vehicle ground speed; and
a cruise speed selection mechanism configured to set the vehicle cruise speed to the vehicle ground speed when cruise control is activated.

4. The cruise control system of claim 1, further comprising:
a cruise speed selection mechanism configured to enable the operator to select the vehicle cruise speed.

5. The cruise control system of claim 1, further comprising:
a cruise resume selection mechanism configured to enable the operator to set the vehicle cruise speed to a previously selected cruise speed.

6. The cruise control system of claim 1, wherein the one or more vehicle interlocks include a parking brake interlock, and when the parking brake interlock indicates a parking brake is activated then the cruise control controller deactivates and prevents activation of cruise control.

7. The cruise control system of claim 1, further comprising:
a vehicle ground speed interface configured to monitor the vehicle ground speed; and
wherein the one or more vehicle interlocks include a minimum cruise speed interlock configured to set a minimum cruise control speed, and
when the vehicle ground speed is or goes below the minimum cruise control speed then the cruise control controller deactivates and prevents activation of cruise control.

8. The cruise control system of claim 1, wherein the one or more vehicle interlocks include an implement status interlock, and when the implement status interlock indicates a monitored implement is raised then the cruise control controller deactivates cruise control.

9. The cruise control system of claim 1, wherein when a triggered interlock of the one or more vehicle interlocks is triggered while a cruise control activation mechanism is activated or cruise control is active, the cruise control controller notifies the operator of the triggered interlock and deactivates cruise control.

10. The cruise control system of claim 1,
wherein the cruise control controller is configured to adjust a vehicle engine speed to maintain the vehicle ground speed at the vehicle cruise speed.

11. A cruise control method for a work vehicle, the cruise control method comprising:
monitoring one or more vehicle interlocks, each of the one or more vehicle interlocks configured to monitor a vehicle system status;
when at least one of the one or more vehicle interlocks is triggered and cruise control is not activated, notifying an operator of the at least one triggered vehicle interlock and preventing cruise control activation;

when at least one of the one or more vehicle interlocks is triggered and cruise control is activated, notifying the operator of the at least one triggered vehicle interlock and deactivating cruise control;

when none of the one or more vehicle interlocks is triggered, activating cruise control, monitoring header load information via an implement interface, predicting changes to a vehicle ground speed by a cruise control controller based on the header load information, and adjusting the vehicle ground speed in response to the header load information and the predicted changes, wherein adjusting the vehicle ground speed in response to the header load information and the predicted changes comprises adjusting the vehicle ground speed to a vehicle cruise speed.

12. The cruise control method of claim 11, further comprising:
monitoring a cruise control activation mechanism configured to enable an operator to activate cruise control;
when the cruise control activation mechanism is activated and none of the one or more vehicle interlocks is triggered, activating cruise control and maintaining the vehicle ground speed at the vehicle cruise speed; and
when the cruise control activation mechanism is deactivated, deactivating cruise control and preventing cruise control activation regardless of whether any of the one or more vehicle interlocks is triggered.

13. The cruise control method of claim 11, further comprising:
monitoring the vehicle ground speed; and
when activating cruise control, setting the vehicle cruise speed to the vehicle ground speed.

14. The cruise control method of claim 11, further comprising:
monitoring a cruise speed selection mechanism configured to enable the operator to select the vehicle cruise speed;
when cruise control is activated, maintaining the vehicle ground speed at the selected vehicle cruise speed.

15. The cruise control method of claim 11, further comprising:
monitoring a cruise resume selection mechanism;
when the cruise resume selection mechanism is activated and none of the one or more vehicle interlocks is triggered, activating cruise control and maintaining the vehicle cruise speed at a previously selected cruise speed.

16. The cruise control method of claim 11, wherein the one or more vehicle interlocks include a parking brake interlock; and the method further comprises:
when a cruise control activation mechanism is activated while a parking brake is activated, preventing activation of cruise control; and
when the parking brake is activated while cruise control is active, deactivating cruise control.

17. The cruise control method of claim 11, wherein the one or more vehicle interlocks include a minimum cruise control speed; and the method further comprises:
when a cruise control activation mechanism is activated while the vehicle ground speed is below the minimum cruise control speed, preventing activation of cruise control; and
when the vehicle ground speed goes below the minimum cruise control speed while cruise control is active, deactivating cruise control.

18. The cruise control method of claim 11, wherein the one or more vehicle interlocks include an implement status; and the method further comprises:
    when the implement status changes to indicate an implement is raised while cruise control is active, deactivating cruise control.

19. The cruise control method of claim 11, further comprising:
    when a triggered interlock of the one or more vehicle interlocks is triggered while a cruise control activation mechanism is activated or cruise control is active, notifying the operator of the triggered interlock and deactivating cruise control.

20. The cruise control method of claim 11, wherein adjusting the vehicle ground speed in response to the header load information and the predicted changes includes adjusting a vehicle engine speed to adjust the vehicle ground speed.

* * * * *